United States Patent
Hirtreiter et al.

(10) Patent No.: US 6,514,670 B1
(45) Date of Patent: Feb. 4, 2003

(54) METHOD FOR DESIGNING AND MANUFACTURING A MICROMECHANICAL DEVICE

(75) Inventors: Josef Hirtreiter, Gerlingen (DE); Bernhard Elsner, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/600,232

(22) PCT Filed: Dec. 1, 1998

(86) PCT No.: PCT/DE98/03521
§ 371 (c)(1),
(2), (4) Date: Jul. 12, 2000

(87) PCT Pub. No.: WO99/35305
PCT Pub. Date: Jul. 15, 1999

(30) Foreign Application Priority Data

Jan. 12, 1998 (DE) .......................... 198 00 745

(51) Int. Cl.[7] .......................... C25D 5/02; C23C 14/04; G03C 5/56
(52) U.S. Cl. .................. 430/313; 430/315; 430/322; 427/162; 427/250; 427/576; 216/24
(58) Field of Search .................. 430/313–315, 430/322; 427/162–250, 576; 216/24

(56) References Cited

U.S. PATENT DOCUMENTS

| 5,382,505 A | 1/1995 | Schmidt et al. ............. 430/313 |
| 5,511,428 A | * 4/1996 | Goldberg et al. ............. 73/777 |
| 5,526,951 A | 6/1996 | Bailey et al. .................. 216/24 |
| 6,030,515 A | * 2/2000 | Heyers et al. .............. 205/118 |

FOREIGN PATENT DOCUMENTS

| DE | 197 32 250 | 1/1999 |
| WO | WO 92 03740 | 3/1992 |

* cited by examiner

Primary Examiner—Mark F. Huff
Assistant Examiner—Daborah Chacko-Davis
(74) Attorney, Agent, or Firm—Kenyon & Kenyon (57) ABSTRACT

A method for designing and manufacturing a micromechanical device providing a substrate having an anchoring region forming a sacrificial layer on substrate while leaving bare the anchoring region depositing an adhesion layer (30) on the sacrificial layer (25) and the anchoring region (20; 120; 220; 320, 325; 420, 425; 620; 755); forming a mask on the adhesion layer; depositing an electroplating layer on the unmasked region of the adhesion layer; and removing the mask and the sacrificial layer.

15 Claims, 6 Drawing Sheets

METHOD FOR DESIGNING AND MANUFACTURING A MICROMECHANICAL DEVICE

FIELD OF THE INVENTION

The present invention relates to a method for designing and manufacturing a micromechanical device, in particular a micromechanical oscillating mirror.

Although in principle applicable to arbitrary micromechanical devices, the present invention as well as its underlying problem are explained with respect to a micromechanical oscillating mirror.

BACKGROUND INFORMATION

Micromechanical oscillating mirrors are used, for example, as switching elements in optical transmission engineering or as scanning element for deflecting a laser beam for bar-code recognition, for room monitoring, or as a marking instrument.

The present invention is based on the problem that the micromechanical conventional oscillating mirrors are short-lived and difficult to manufacture. In particular, temperature problems and problems due to mechanical stresses exist with the materials used such as polysilicon. By using low-stress electroplating layers, it is possible, in particular for mirror surfaces to be manufactured without curvature.

SUMMARY

The designing and manufacturing method according to the present invention has the advantage over conventional design approaches that the resulting micromechanical device is stress- and temperature-compensated so that both freedom in the choice of material and in the selection of the operating temperature, which is typically in the range of −40° C. to +130° C., exists.

It is the basic idea of the present invention that the micromechanical device electrodeposited on the unmasked region of the adhesion layer using the "additive technique" is supported in the anchoring region and tiltable about at least one axis or able to execute torsional vibrations subsequent to the removal of the sacrificial layer. In the proposed designs, the advantages of the additive technique can be fully exhausted.

The additive technique makes it possible to reduce the size of the previous micromechanical design approaches and, in connection with that, to reduce the price and develop new possibilities for use. The designing and manufacturing method according to the present invention thus provides cost-effective, reliable and long-lived micromechanical devices. In particular, the additive technique allows freely movable metal patterns to be produced on an arbitrary substrate such as a silicon substrate, glass substrate, or a ceramic substrate.

In addition, the additive technique allows large, unperforated surfaces to be bared so that massive mirror surfaces having dimensions up to several millimeters can be manufactured. As a single-layer electroplating process, the technique is cost-effective and can be controlled well. A multi-layer electroplating process can be carried out, as well, for example, for manufacturing the anchoring regions and the mirror surface or the suspensions separately. Large tilting angles can be attained by correspondingly thick sacrificial layers.

According to an example embodiment, a metallic connection pad, e.g. of a circuit integrated in the substrate is provided as anchoring region. Both a manufacture as discrete device and a manufacture in a form that is integrated in a service connection are possible. If the micromechanical device is integrated on an integrated circuit, the metallization of the integrated circuit can advantageously be used for anchoring.

According to a further preferred embodiment, a first photoresist layer having a thickness of several microns is formed as sacrificial layer. The photoresist can easily be removed in an isotropic etching process. When using a polymer sacrificial layer, the distance of the mirror element from the substrate can be adjusted very accurately, distances from several microns to approximately 150 $\mu$m may be achieved.

In another example embodiment, the first photoresist layer is patterned photolithographically for leaving bare the anchoring region.

According to a further example embodiment, the adhesion layer is sputtered.

In a further example embodiment, the adhesion layer is a conductive layer of Cu—Cr having a thickness of several nanometers. The chromium serves as adhesion layer toward the underlying photoresist; the copper serves as a starting layer for the subsequent electrodeposition. Other adhesion layers, such as Cr—Au, etc., are, of course, also possible.

According to a further example embodiment, the mask is formed on the adhesion layer by the following steps: forming a second photoresist layer on the adhesion layer; forming a silicon dioxide layer on the second photoresist layer; patterning a third photoresist layer photolitographically; and plasma etching the silicon dioxide layer for forming a hard mask for the second photoresist layer; and etching the second photoresist layer masked by the patterned silicon dioxide layer down to the adhesion layer. In this context, the second photoresist layer is used as polymer negative matrix for the electrodeposition.

In another preferred embodiment, a nickel layer or a nickel-cobalt layer is deposited as electroplating layer. Layers of that kind can be manufactured free of stress, evenly, and with a good reflectivity.

According to a further example embodiment, the sacrificial layer in the form of the first photoresist layer, the polymer mold formed by the second photoresist layer, and the adhesion layer are removed subsequent to the deposition of the electroplating layer.

In a further example embodiment, the micromechanical device is an oscillating mirror which is designed in such a manner that it can execute torsional vibrations about at least one axis. The oscillating mirror can be operated as a simple tilting mirror as well as in resonance as scanning mirror when using a thicker sacrificial layer. The oscillating mirrors can be designed in such a manner that they are tiltable in one, two or as many as desired directions.

According to another example embodiment, a counter-electrode is provided on the substrate under the mirror surface.

According to further example embodiment, the oscillating mirror is designed such that it can execute torsional vibrations about four or more axes.

In a further example embodiment, the oscillating mirror is designed such that it is suspended on a surrounding frame which is anchored in the anchoring region. Thus, an uninterrupted or non-cutout mirror region can be achieved.

According to another example embodiment, the oscillating mirror is designed such that the anchoring region is provided in a cutout of the mirror surface.

DETAILED DESCRIPTION

In the figures, identical reference symbols designate identical or functionally identical elements.

FIGS. 1a–g show the precess steps of a first specific embodiment of the method according to the present invention for designing and manufacturing a micromechanical device in a cross-sectional representation.

In FIG. 1, reference symbol 10 designates a substrate having a ready-processed service connection, the substrate having a passivation layer 15 with open connection pads 20 embedded therein. 25 designates a sacrificial layer in the form of a first photoresist layer, 30 designates an adhesion layer in the form of a sputtered electroplating starting layer (plating base), 40 a second photoresist layer, 50 a silicon dioxide layer, 60 a third photoresist layer, and 35 an electroplating layer in the form of. a nickel plating.

Figure 1A:
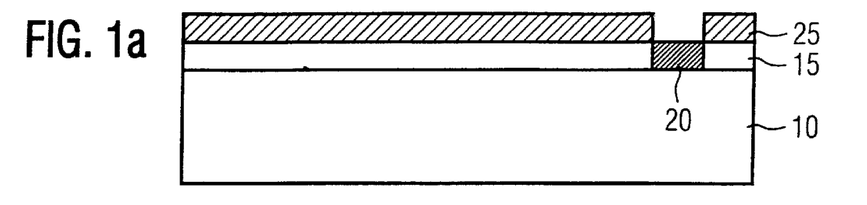
FIG. 1a–g show the precess steps of a first specific embodiment of the method according to the present invention for designing and manufacturing a micromechanical device in a cross-sectional representation.

The starting point for manufacturing the micromechanical device according to the first specific embodiment of the present invention is the ready-processed service connection including passivation layer 15 and open connection pads 20.

In a first step, as illustrated in FIG. 1a, a first photoresist layer is applied as sacrificial layer 25 and patterned in such a manner that connection pad 20 lies exposed. This connection pad 20 is used as anchoring region for the micromechanical device to be manufactured. First photoresist layer 25 can expediently be used both for opening connection pad 20 and as sacrificial layer if the opening of connection pad 20 must be carried out in passivation layer 15 first.

Figure 1B:
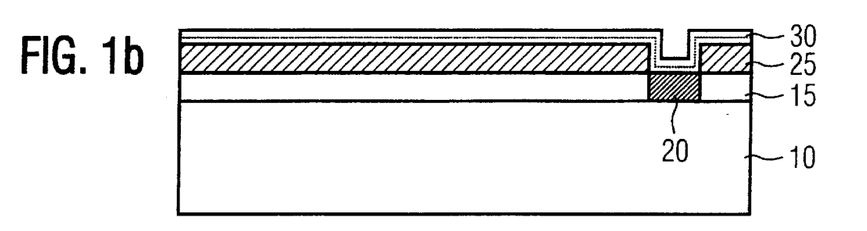

In a next step, as shown in FIG. 1b, adhesion layer 30 is sputtered in the form of an electroplating starting layer (plating base) which, in the present example, is a conductive layer of chromium copper. In this context, the chromium provides the adhesion toward underlying first photoresist layer 25; the copper serves as starting layer for the subsequent step of electrodeposition.

Figure 1C:
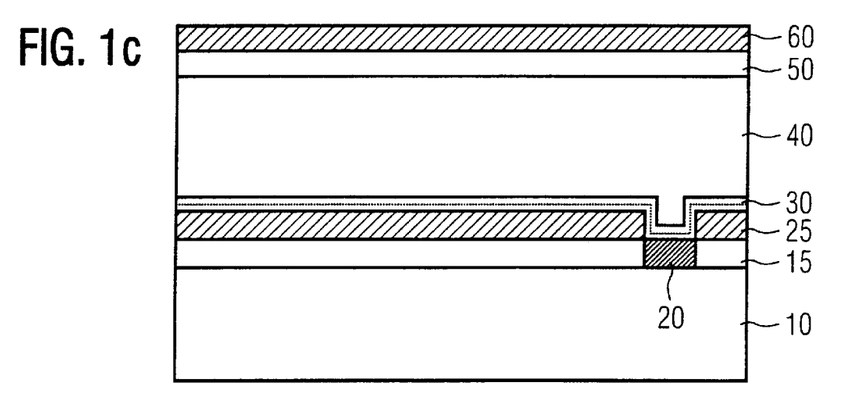

As depicted in FIG. 1c, an approximately 15 μm thick second photoresist layer 40 is applied to adhesion layer 30 by spinning and hardened at temperatures of typically 200° C.

Figure 1D:
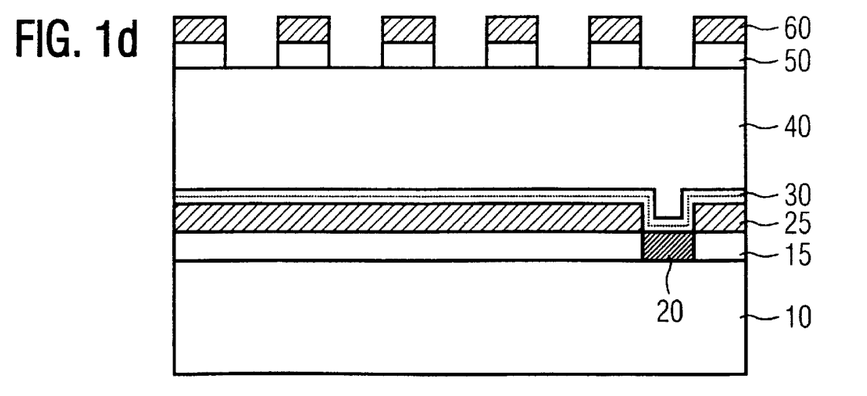

Using the plasma CVD method (CVD=chemical vapor deposition), an approximately 600 nm thick silicon dioxide layer 50 is deposited on second photoresist layer 40. Subsequently, silicon dioxide layer 50 is used as a hard mask for patterning underlying second photoresist layer 40 and is patterned for that purpose by a photolithographic process using a third photoresist layer 60, and by subsequent plasma etching, as shown in FIG. 1d.

Figure 1E:
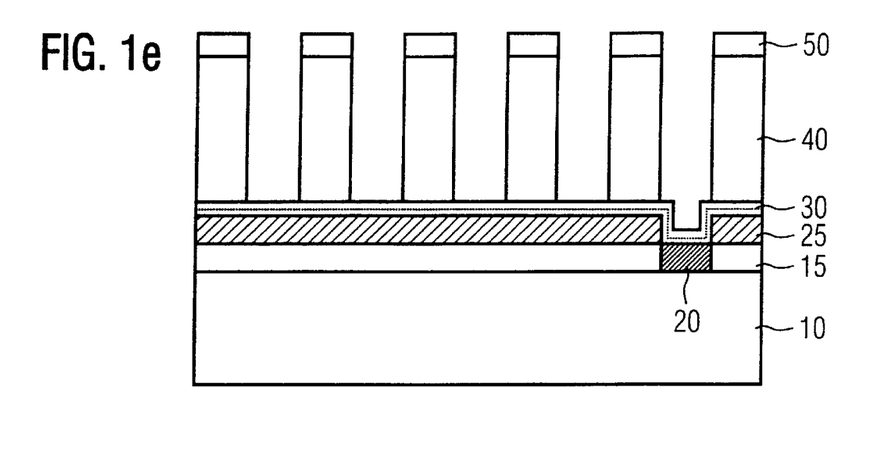
Figure 1F:
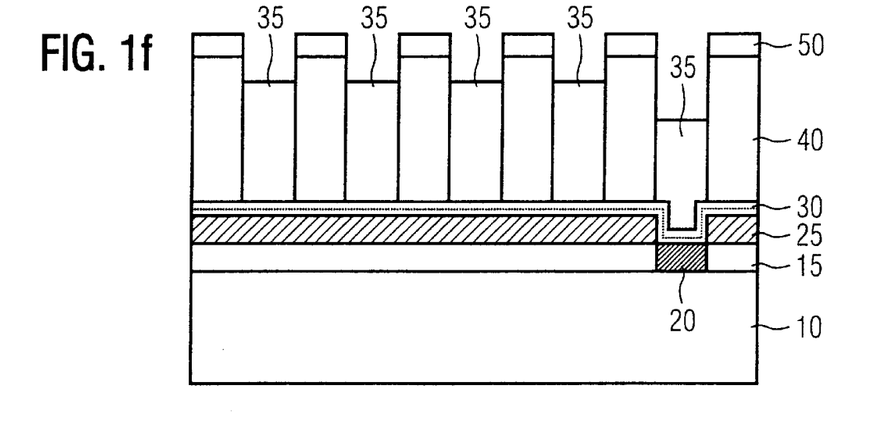

Subsequent to overetching silicon dioxide layer 50, a trench etching of second photoresist layer 40 is carried out using an anisotropic plasma etching process. The pattern resulting therefrom is shown in FIG. 1e.

Deposited into the polymer negative matrix formed by second photoresist layer 40 and resulting in this manner is a nickel plating having a thickness of several microns. Resulting therefrom is the comb pattern shown in FIGS. 1f and 1g. In this context, it should be mentioned that the individual regions of second electroplating layer 35 are interconnected at regions which are not shown in this cross-sectional representation.

Figure 1G:
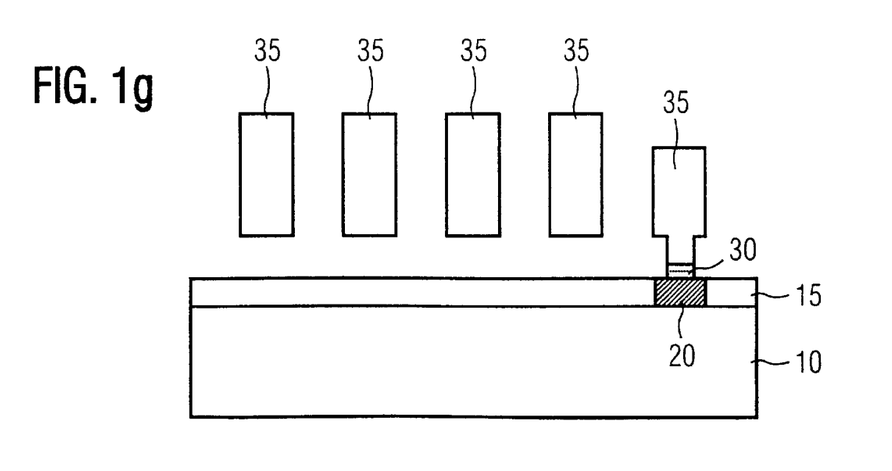

Subsequently, silicon dioxide layer 50 is removed by wet chemical etching, and the polymer negative matrix in the form of patterned second photoresist layer 40 is removed by dry chemical etching.

Subsequently, adhesion layer 30 is wet chemically etched selectively, and the sacrificial layer in the form of first photoresist layer 25 is etched in a plasma, resulting in the pattern shown in FIG. 1g.

The removal of sacrificial layer 25 in the form of first photoresist layer is an isotropic etching process, the photoresist under nickel combs 35 being completely removed.

The result is a capacitively operated micromechanical device having free-moving patterns, as can shown in FIG. 1g.

Figure 2:
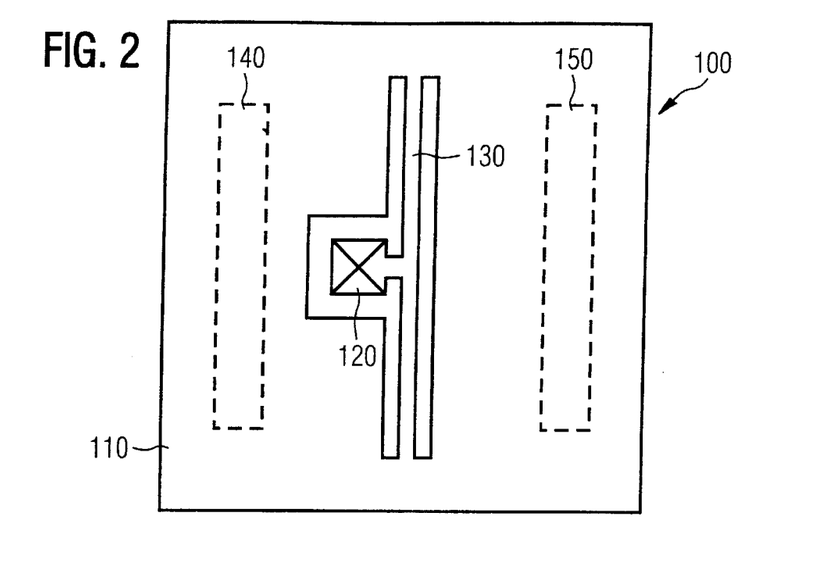
FIG. 2 shows a top view of a first example of a micromechanical oscillating mirror which can be manufactured using the designing and manufacturing method according to the present invention.

FIG. 2 is a top view of a first example of a micromechanical oscillating mirror which can be manufactured using the designing and manufacturing method according to the present invention.

In FIG. 2, reference number 100, designates generally a first mirror form, 110 a mirror surface, 120 an anchoring region, 130 a torsion spring suspension, and 140, 150 counter-electrodes which are provided on the substrate underneath mirror surface 110.

In the case of first mirror form 100, the anchoring and the suspension are provided in the inner region in mirror surface 110. Mirror surface 110 is attached to torsion spring suspension 130 for suspension. This suspension is completely stress- and temperature-compensated which is expedient when using metal components on silicon, etc. Otherwise, in fact, the spring rods or mirror elements bend, which generally results in a functional failure. Via the geometry of torsion spring suspension 130, the resonant frequency of the oscillating mirror including mirror form 100 can be adjusted if a use as a scanner is intended. For example FIG. 3 is a top view of a second example of a micromechanical oscillating mirror which can be manufactured using the designing and manufacturing method according to the present invention.

Figure 3:
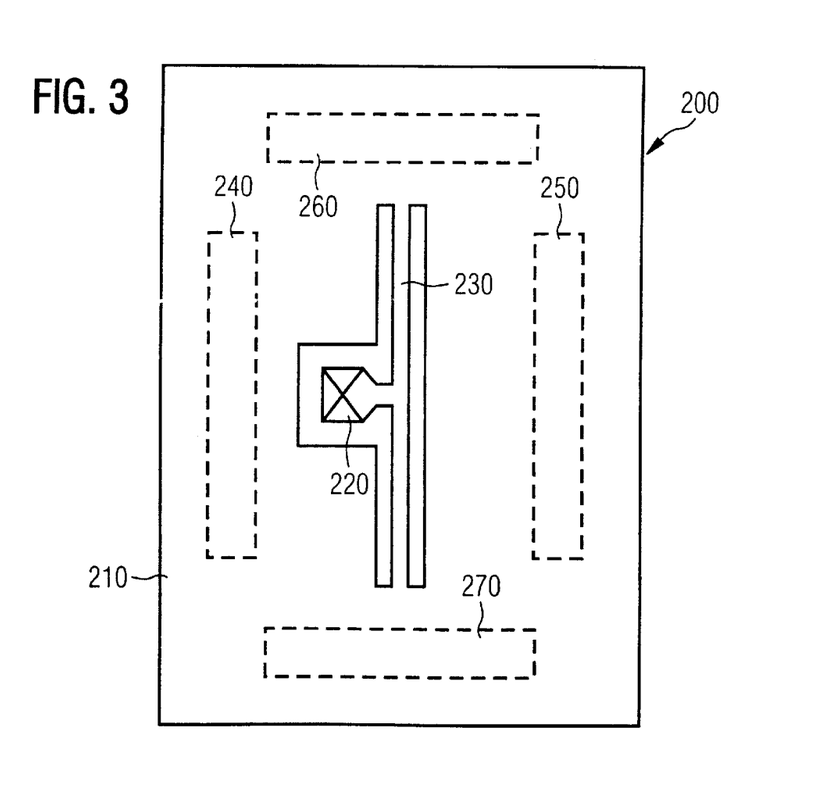
FIG. 3 shows a top view of a second example of a micromechanical oscillating mirror which can be manufactured using the designing and manufacturing method according to the present invention.

In FIG. 3, number 200 designates a second mirror form, 210 a mirror surface, 220 an anchoring region, 230 a torsion spring suspension, and 240, 250, 260, 270 counter-electrodes which are provided on the substrate underneath mirror surface 210.

In this second mirror form 200, the anchoring and the suspension are also provided inside in the region of mirror surface 210; in contrast to the above first example, however, a deflection about two axes which are perpendicularly to each other is possible here because of two further counter-electrodes. With respect to the second axis, torsion spring suspension 230 does not act as torsion rod but as normal cantilever spring.

Figure 4:
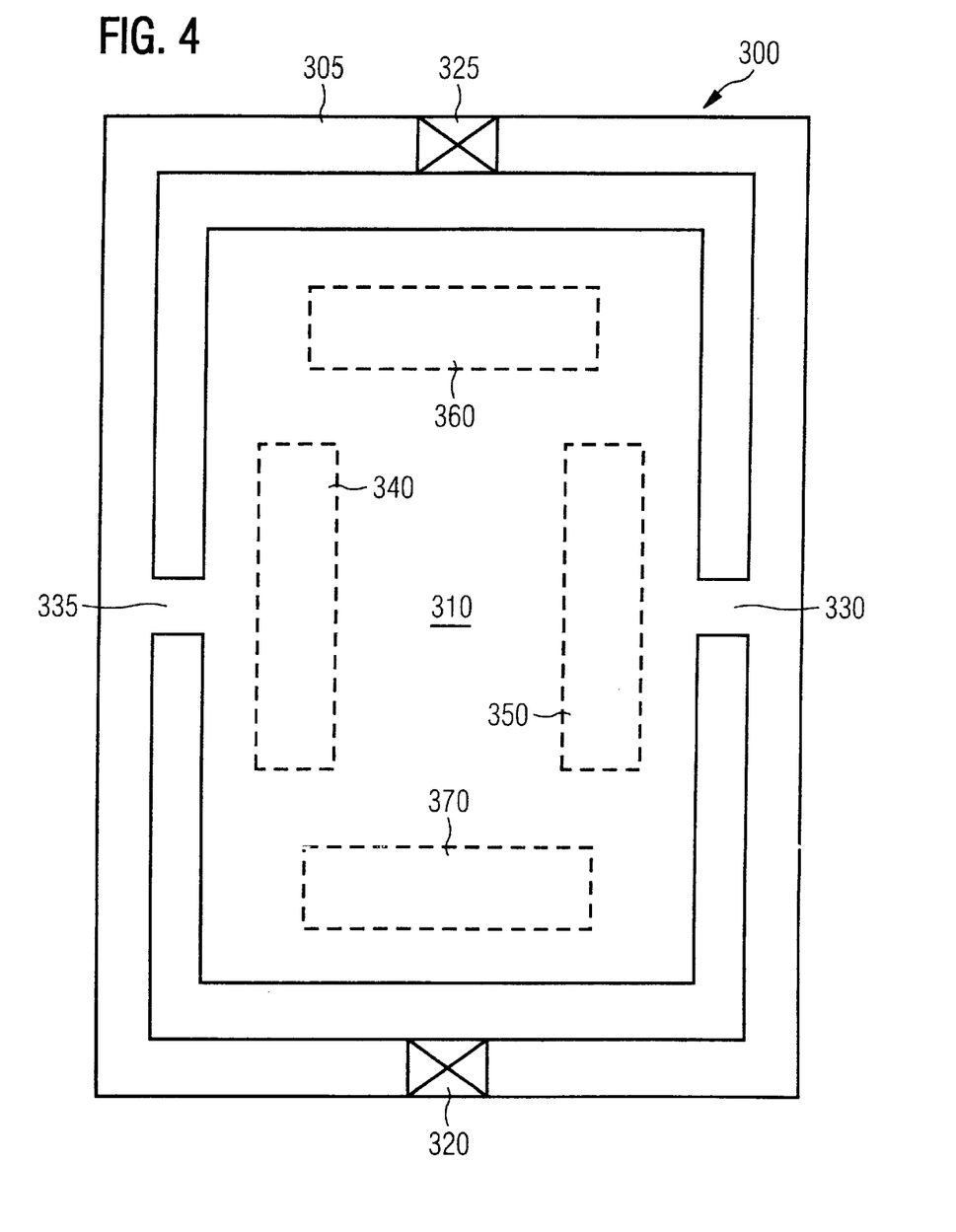
FIG. 4 shows a top view of a third example of a micromechanical oscillating mirror which can be manufactured using the designing and manufacturing method according to the present invention.

FIG. 4 is a top view of a third example of a micromechanical oscillating mirror which can be manufactured using the designing and manufacturing method according to the present invention.

In FIG. 4, number 300 designates a third mirror form, 305 a frame, 310 a mirror surface, 320, 325 an anchoring region, 330, 335 a torsion spring suspension, and 340, 350, 360, 370 electrodes which are provided on the substrate underneath mirror surface 310.

In this third example, in contrast to the first and to the second example, torsion spring suspension 330, 335 is achieved by two torsion springs which connect mirror surface 310 to frame 305. Frame 305, in turn, is joined to the substrate via anchorings 320, 325. With respect to torsion spring suspension 330, 335 and mirror surface 310, this type of construction is expediently stress- and temperature-compensated, as well.

Figure 5:
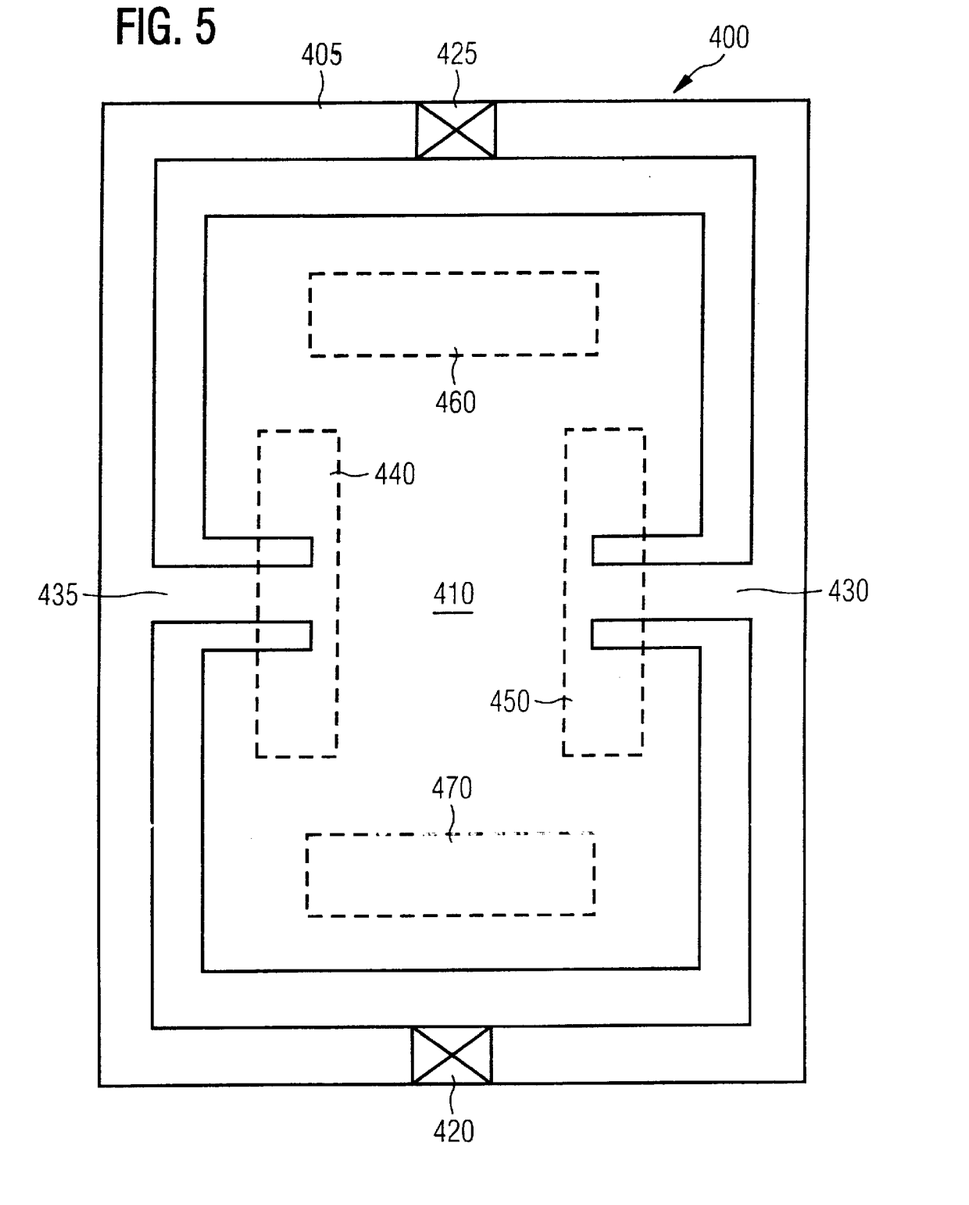
FIG. 5 shows a top view of a fourth example of a micromechanical oscillating mirror which can be manufactured using the designing and manufacturing method according to the present invention.

FIG. 5 is a top view of a fourth example of a micromechanical oscillating mirror which can be manufactured using the designing and manufacturing method according to the present invention.

In FIG. 5, 400 designates a third mirror form, 405 a frame, 410 a mirror surface, 425 an anchoring region, 430, 435 a torsion spring suspension, and 440, 450, 460, 470 counter-electrodes which are provided on the substrate underneath mirror surface 410.

In this fourth example, in contrast to the third example according to FIG. 4, the length of torsion springs 435, 430 is lengthened in a manner that it extends into mirror surface 410. This enables adaptation of the desired resonant frequency in the case of a use as scanner.

Figure 6:
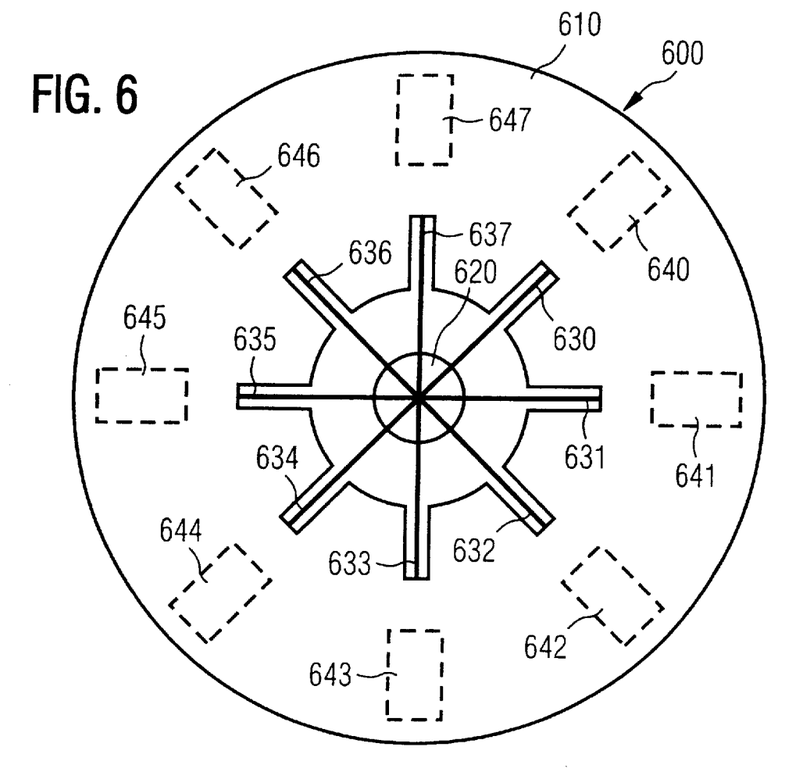
FIG. 6 shows a top view of a fifth example of a micromechanical oscillating mirror which can be manufactured using the designing and manufacturing method according to the present invention.

FIG. 6 is a top view of a fifth example of a micromechanical oscillating mirror which can be manufactured using the designing and manufacturing method according to the present invention.

In FIG. 6, reference number 600 designates a fifth mirror form, 610 a mirror surface, 620 an anchoring region, 630, 631, 632, 633, 634, 635, 636, 637 a torsion spring suspension, 640, 641, 642, 643, 644, 645, 646, 647 counter-electrodes which are provided on the substrate underneath mirror surface 610.

In the example shown in FIG. 6, mirror surface 610 may be tilted about eight axes. Anchoring region 620 is circular and is located in the middle of likewise circular concentric mirror surface 610. Torsion springs 630–637 of the torsion spring suspension extend from anchoring region 620 toward annular mirror surface 610. The direction of tilting is selected by a control (not shown) of counter-electrodes 640–647 located below. When working with resonant frequencies of the pattern in the range of 100 Hz to several kHz, images may be projected at a refresh rate in the range of 50–100 Hz with the aid of this mirror form. This example can of course be generalized to more than eight axes for tilting.

Figure 7:
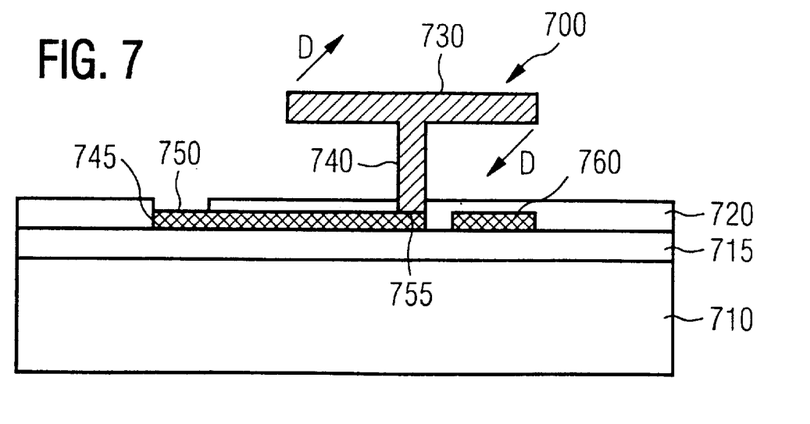
FIG. 7 shows a cross-sectional view of a sixth example of a micromechanical oscillating mirror which can be manufactured using the designing and manufacturing method according to the present invention.

FIG. 7 is a sixth example of a micromechanical oscillating mirror which can be manufactured using the designing and manufacturing method according to the present invention, FIG. 7 showing the basic construction of the previously described designs in a cross-sectional view.

In FIG. 7, reference number 700 designates a sixth mirror form, 710 a substrate, 715 a first insulating layer, 720 a second insulating layer, 730 a mirror surface, 740 a support, 745 a metal layer, 750 a connection pad, 755 an anchoring region, 760 a counter-electrode, and D a deflecting device.

In sixth mirror form 700, in contrast to the specific embodiment according to FIG. 1*a–g*, the anchoring is implemented in anchoring region 775 of metal layer 745, metal layer 745 being a layer which is additionally applied to substrate 710 while interposing first insulating layer 715. The connection of the oscillating mirror to the service connection (not shown) is carried out by bonding via connection pad 750. Counter-electrode 760 is used for deflecting this oscillating mirror according to sixth mirror form 700 in deflecting direction D.

Although the designing and manufacturing method has been described above on the basis of preferred exemplary embodiments, it is not limited thereto but can be modified in many ways.

In particular, the choice of layer materials and the thickness of the applied layers can be selected in an application-specific manner.

What is claimed is:

1. A method for manufacturing a micromechanical device, comprising:

providing a substrate having an anchoring region;

forming a sacrificial layer on the substrate while leaving bare the anchoring region;

depositing an adhesion layer on the sacrificial layer and the anchoring region;

forming a mask on the adhesion layer;

depositing an electroplating layer on an unmasked region of the adhesion layer; and removing the mask and the sacrificial layer.

2. The method according to claim 1, further comprising:

providing a metallic connection pad in the substrate as the anchoring region.

3. The method according to claim 2, wherein the metallic connection pad is a metallic connection pad of an integrated circuit.

4. The method according to claim 1, wherein the sacrificial layer includes a first photoresist layer having a thickness of several microns.

5. The method according to claim 4, further comprising:

photolithographically patterning the first photoresist layer for leaving bare the anchoring region.

6. The method according to claim 1, wherein the deposition of the adhesion layer includes sputtering the adhesion layer.

7. The method according to claim 1, wherein the adhesion layer is a conductive layer of Cu—Cr or Au—Cr having a thickness of several nanometers.

8. The method according to claim 1, wherein the step of forming the mask includes the steps of:

forming a second photoresist layer on the adhesion layer;

forming a silicon dioxide layer on the second photoresist layer;

photolithographically patterning a third photoresist layer and plasma etching the silicon dioxide layer for forming a hard mask for the second photoresist layer; and etching the second photoresist layer masked by the patterned silicon dioxide layer down to the adhesion layer.

9. The method according to claim 8, wherein the first and the second photoresist layers and the adhesion layer are removed subsequent to the deposition of the electroplating layer.

10. The method according to claim 1, where a nickel layer or a nickel-cobalt layer is deposited as the electroplating layer.

11. The method according to claim 1, wherein the micromechanical device is an oscillating mirror which executes torsional vibrations about at least one axis.

12. The method according to claim 11, further comprising:

providing a counter-electrode on the substrate under a surface of the mirror.

13. The method according to claim 11, wherein the oscillating mirror executes torsional vibrations about at least four axes.

14. The method according to claim 13, further comprising:

suspending the oscillating mirror on a surrounding frame which is anchored in the anchoring region.

15. The method according to claim 11, wherein the anchoring region is provided in a cutout of a surface of the mirror.

* * * * *

UNITED STATES PATENT AND TRADEMARK OFFICE
CERTIFICATE OF CORRECTION

PATENT NO. : 6,514,670 B1
DATED : February 4, 2003
INVENTOR(S) : Josef Hirtreiter et al.

It is certified that error appears in the above-identified patent and that said Letters Patent is hereby corrected as shown below:

<u>Title page,</u>
Item [57], ABSTRACT,
Line 2, change "device providing" to -- device is described which includes the steps of providing --
Lines 4-6, delete "(30), (25), (20; 120; 220; 320, 325, 420, 425; 620; 755);"

<u>Column 1,</u>
Line 22, change "micromechanical conventional" to -- coventional micromechanical --
Line 67, change "substrate is" to -- substrate, is --

<u>Column 2,</u>
Lines 7 and 37, change "preferred" to -- example --
Line 30, delete "and"

<u>Column 3,</u>
Line 48, change "of. a" to -- of a --
Line 52, change "pads" to -- pad --

<u>Column 4,</u>
Line 38, change "as can shown" to -- as shown --
Line 60, change "intended. For example" to -- intended, for example. --
Line 65, change "number 200" to -- reference number 200 --

<u>Column 5,</u>
Line 15, change "number 300" to -- reference number 300 --
Line 63, change "mirror form." to -- mirror form 600. --

Signed and Sealed this

Twenty-seventh Day of July, 2004

JON W. DUDAS
*Acting Director of the United States Patent and Trademark Office*